UNITED STATES PATENT OFFICE.

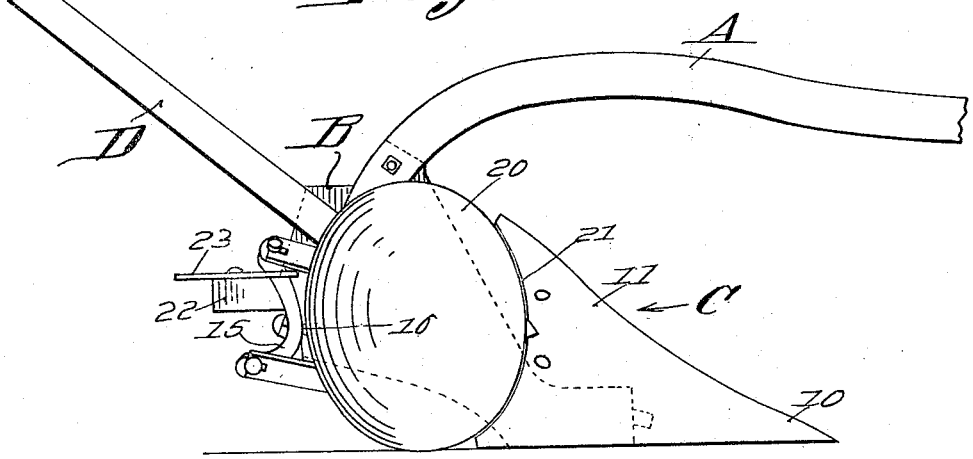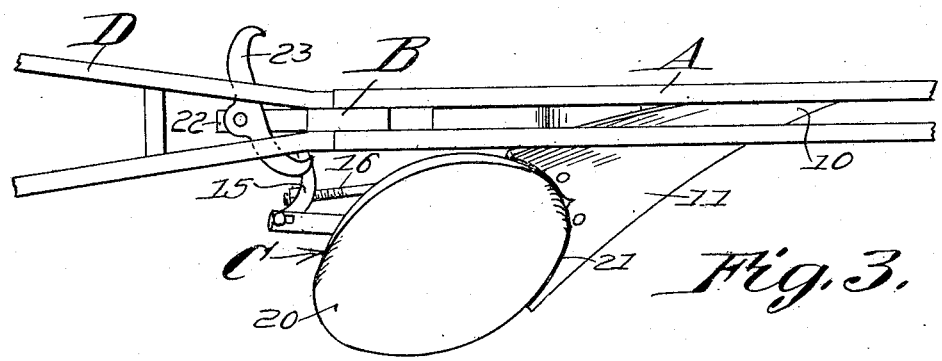

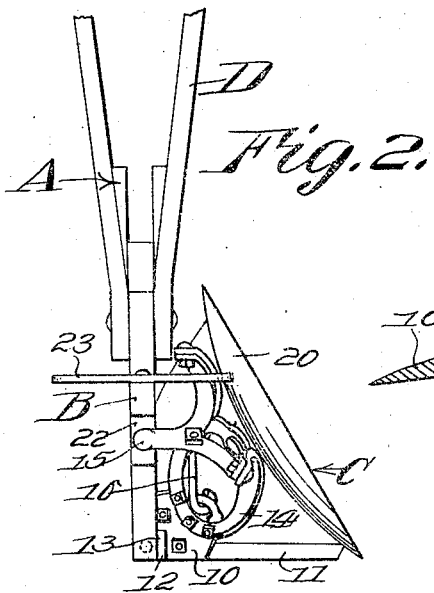
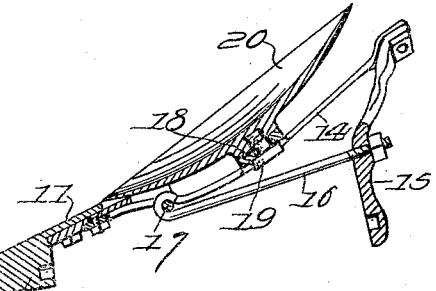
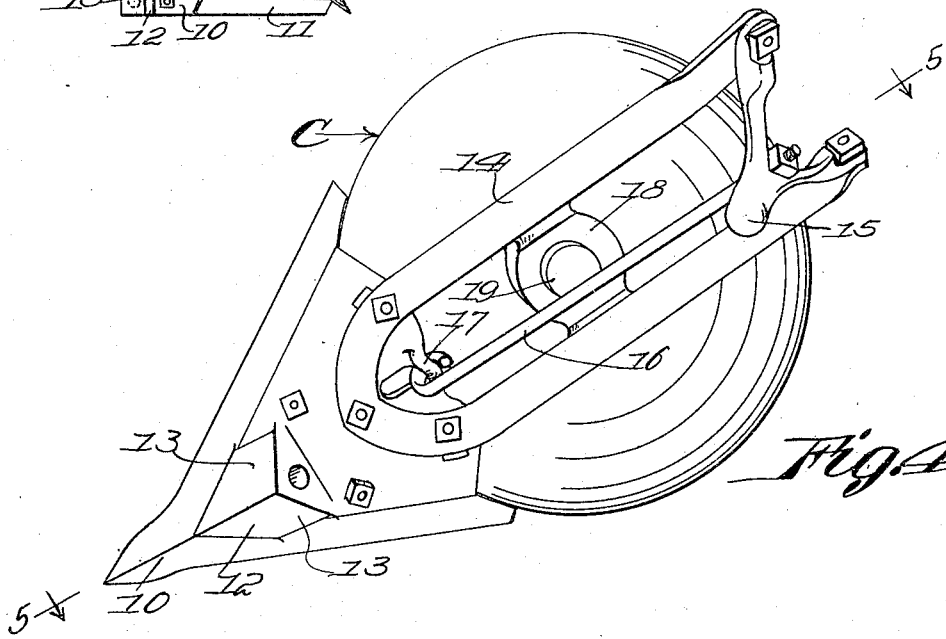

HENRY G. RUSK, OF ORLANDO, FLORIDA.

PLOW.

1,271,373.  Specification of Letters Patent.  Patented July 2, 1918.

Application filed July 3, 1917. Serial No. 178,517.

*To all whom it may concern:*

Be it known that I, HENRY GRADY RUSK, a citizen of the United States, residing at Orlando, in the county of Orange and State of Florida, have invented certain useful Improvements in Plows, of which the following is a specification, reference being had therein to the accompanying drawing.

The invention relates to a hill side plow, and more particularly to the class of swiveled or reversible hill side plows.

The primary object of the invention is the provision of a plow of this character wherein the reversible plow body, for the positioning thereof on either side of a stock, carries a moldboard in the form of a concaved disk rotatably supported to effect the complete turning over of the soil from the furrow in the advancement of the plow through a field.

Another object of the invention is the provision of a plow of this character wherein the rotary moldboard releases pressure of the soil upon the plow and assures a positive turning over of the soil with the least resistance to the draft of said plow.

A further object of the invention is the provision of a plow of this character wherein the rotary disk constituting the moldboard is mounted upon the plow body in a novel manner and can be readily detached or removed when the occasion requires, and the particular mounting of the rotary disk eliminates the clogging of the plow in its operation.

A still further object of the invention is the provision of a plow of this character which is simple in construction, thoroughly reliable and efficient in operation, strong, durable and inexpensive in manufacture.

Other objects will be in part obvious and in part hereinafter set forth.

The invention accordingly consists in the features of construction, combination of elements and arrangement of parts which will be exemplified in the construction hereinafter described, and the scope of the application of which will be indicated in the appended claims.

In the accompanying drawings:

Figure 1 is a side elevation of a plow showing the rotary disk moldboard constructed in accordance with the invention applied thereto;

Fig. 2 is a rear elevation;

Fig. 3 is a top plan view;

Fig. 4 is a perspective view of the plow body removed from the plow stock, looking toward the inner side thereof;

Fig. 5 is a sectional view on the line 5—5 of Fig. 4.

Similar reference characters indicate corresponding parts throughout the several views of the drawings.

Referring to the drawings in detail, A designates the beam, B the stock, C the swiveled plow body and D the handles of the hill side plow, the beam A and handles D being rigidly bolted or otherwise fastened to the stock B in the usual manner, while the plow body C is pivoted or swiveled on the stock B so as to swing to either side thereof for the positioning of the plow body at the right or left hand side of the plow.

The plow body C comprises a front casting 10 which is of triangular shape and carries the share 11 bolted or otherwise fastened thereto, the casting being formed with a swiveled bearing 12 which receives the front pivot or swiveled connection with the stock B, as shown in dotted lines in Fig. 1. The bearing 12 is formed with the flat faces 13 which constitute the land sides of the plow body, and bolted or otherwise fastened to the casting 10 is a substantially U-shape frame 14 which has its arms or limbs at their rear ends detachably secured to the rear casting 15, which has pivotal connection with the stock B, and this casting has detachably engaged therein a clamping member 16 which engages with an ear 17 formed on the front casting 10 and by this clamping member, the two castings are frictionally held in position on the stock B of the plow.

Formed on the frame 14 is a journal bearing 18 in which is rotatably mounted the center journal 19 of the rotary moldboard which comprises a concavo-convex disk 20, and on the advance of the plow through a field for the cutting of furrows therein the disk will rotate to effect the complete turning over of the soil from the furrow. The rotatable mounting of the disk avoids the least resistance to the draft of said plow.

The share 11 of the plow body is cut away at its rear edge, as at 21, to accommodate the periphery of the disk 20 which is positioned directly rearwardly of the share.

Formed on the stock B is a rear extension 22, upon which is mounted a foot-actuated locking device 23 for engagement with the rear casting 15 when swung to either side of said stock so that the plow body will be locked in its reversed positions at either side of the plow.

The disk 20 serves as a substitute for a stationary moldboard or turning wing and effects the positive and complete turning over of the soil cut from the furrow by the share 11 when the plow is advanced through the field.

From the foregoing description, taken in connection with the accompanying drawings, the construction and operation of the herein described plow will be readily apparent and, therefore, a more extended explanation has been omitted.

Having thus described my invention, I claim:

1. In a plow, a stock, a forward casting provided with a plow share mounted thereon, a substantially U-shaped frame secured to the casting and having its limbs extending rearwardly therefrom, a rear casting detachably connected to the free ends of the limbs of the frame, a clamping member connecting the forward and rear castings and securing the whole to the stock, the stock having means for pivotal engagement with both castings, the stock being further provided with a rear extension, a locking device mounted upon the rear extension and adapted to engage the rear casting on either side of the stock, and a rotatable concavo-convex disk carried by the U-shaped frame so that it will stand rearwardly of the forward casting, whereby both the share and the disk may be shifted to either side of the stock to permit of right and left hand plowing.

2. In a plow, a stock, a forward casting provided with a plow share mounted thereon, a substantially U-shaped frame secured to the casting and having its limbs extending rearwardly therefrom, a rear casting detachably connected to the free ends of the limbs of the frame, a clamping member connecting the forward and rear castings and securing the whole to the stock, the clamping member comprising a rod member whose one end loosely engages the front casting, the latter having an ear provided for such engagement, and a nut threadingly engaging the rod member at the other end, the rod member passing slidably through the rear casting, the stock having pivotal engagement with both castings, the stock being further provided with a rear extension, a locking device mounted upon the rear extension and adapted to engage the rear casting on either side of the stock, and a rotatable concavo-convex disk carried by the U-shaped frame so that it will stand rearwardly of the forward casting, whereby both the share and the disk may be shifted to either side of the stock to permit of right and left hand plowing.

In testimony whereof I affix my signature.

HENRY G. RUSK.

Copies of this patent may be obtained for five cents each, by addressing the "Commissioner of Patents, Washington, D. C."